United States Patent [19]
Koop et al.

[11] Patent Number: 4,834,843
[45] Date of Patent: May 30, 1989

[54] METHOD OF MARKING DISC-SHAPED INFORMATION CARRIERS

[75] Inventors: Hermann Koop, Ronnenberg; Hans Schüddekopf, Hanover, both of Fed. Rep. of Germany

[73] Assignee: U.S. Philips Corporation, New York, N.Y.

[21] Appl. No.: 151,047

[22] Filed: Feb. 1, 1988

[30] Foreign Application Priority Data

May 8, 1987 [DE] Fed. Rep. of Germany ....... 3715315

[51] Int. Cl.$^4$ ............................................... C25D 1/10
[52] U.S. Cl. ........................................................ 204/5
[58] Field of Search ............................................ 204/5

[56] References Cited

U.S. PATENT DOCUMENTS 1,011,838 12/1911 Owen ...................................... 204/5

Primary Examiner—T. M. Tufariello
Attorney, Agent, or Firm—Norman N. Spain

[57] ABSTRACT

In a method of marking optically readable disc-shaped information carriers which are manufactured, for example, by a transfer-moulding process using at least one mould serving as a stamper, which mould has been derived from a master via at least two electroforming replication steps, the mould is provided with a marking for the subsequent identification of the mould, which marking is situated in an otherwise information-free area of the information carrier to be manufactured and allows the mould thus marked to be identified.

7 Claims, 1 Drawing Sheet

METHOD OF MARKING DISC-SHAPED INFORMATION CARRIERS

BACKGROUND OF THE INVENTION

The invention relates to a method of marking optically readable disc-shaped information carriers which are manufactured by means of at least one mould used as a stamper, which stamper is derived from a master by means of at least one electroforming replication step.

For optically readable disc-shaped information carriers but also for, for example, conventional long-play records, it is known to provide the master with a marking. This marking is generally the catalogue number, which enables the program on the disc to be identified. The marking in the master is preserved throughout the various replication steps including those yielding the stamper and, ultimately, the ready-to-play information carrier. This marking allows the programme content of the information carrier to be identified subsequently, even if the information carrier is not provided with a label or the like.

SUMMARY OF THE INVENTION

It is the object of the invention to provide a method enabling each individually manufactured disc-shaped information carrier, and at least a mould used for its manufacture, to be subsequently identified. This applies not only to the mold used as a stamper for manufacturing the information carrier but also to the moulds manufactured as intermediate steps between master and stamper.

In accordance with the invention this object is achieved in that at least one of the moulds made during the electroforming replication steps is provided with an individual marking, which is situated in an information-free area of the information carrier to be manufactured and which allows the mould thus marked to be identified from the resultant information carrier.

DETAILED DESCRIPTION OF THE INVENTION

Figure 1:
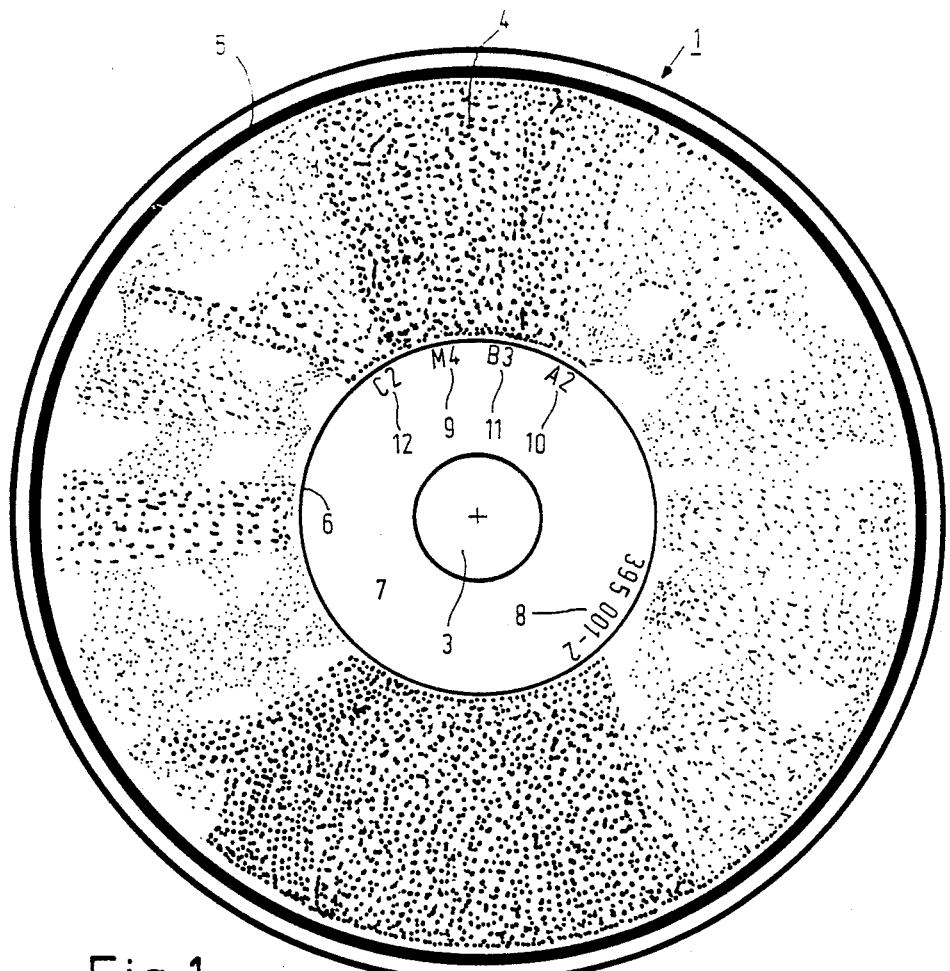
FIG. 1 shows a view, from reading side, of an optical readable disc-shaped unfamiliar carrier in the form of a Compact Disc provided with markings according to the invention.

In manufacturing optically readable disc-shaped information carriers, for example Compact Discs, first of all a master is made which basically comprises a glass substrate on which a photoresist layer is deposited. Separate areas of the photoresist layer are exposed by means of a laser, which areas subsequently appear as elongate recesses (pits) in the disc-shaped information carrier. After development of the photoresist layer and removal of the exposed areas the master is used for at least one replication step by an electro-deposition method. The mould thus obtained may already itself be used as a stamper for the manufacture of disc-shaped information carriers, for example by means of a transfer-moulding method. However, since a stamper is subject to wear and also as a precautionary measure, several moulds are made from the mould thus derived from the master. Generally, the mould made in the third replication step is used as a stamper. If now at least one of the moulds, including the stamper, derived from the master is provided with a marking in accordance with the invention, this marking will subsequently also appear on the disc-shaped information carrier. This marking allows the subsequent identification of the marked mould. Such an identification of the moulds used for the manufacture of a disc-shaped information carrier is often desirable, in particular to ascertain whether in the case of flaws appearing in a manufactured disc-shaped information carrier these flaws are present in the mould, to reject this mould if necessary. This is very important because during production not all defects may be detected and may not be noticed during a subsequent in the discs test procedure or even the consumers. It is then almost impossible to ascertain which discs were manufactured by means of a defective mould. However, if identification by means of a marking on the disc-shaped information carrier is possible, all information carriers manufactured by means of the defective mould can be identified, because they have the same marking as the defective mould. In this way it is subsequently possible to determine which mould has been used for the manufacture of specific disc-shaped information carriers.

In a further embodiment of the invention the master and every mould, including the stamper, produced in the replication process between master and stamper, is provided with an individual marking.

If each of the moulds used for production, including the stamper produced in the replication process, from the master up to and including the stamper, is provided with a marking identifying the relevant mould, the markings on the finished disc-shaped information carriers will enable that all the moulds used for their production in the replication process, from the master up and including to the stamper, can be traced. In this way it is possible to identify any defective mould. When a flaw is detected, it is then possible to sort out all the information carriers manufactured by means of the defective moulds.

In a further embodiment of the invention the marking is formed as a recess having a depth which substantially corresponds to the depth of an information structure in the information carrier to be manufactured subsequently.

When the recesses have a depth of this order of magnitude this ensures that for example in a transfer-moulding process the markings do not disturb the material flow in the transfer-moulding process. A smaller depth is not desirable, because the markings thus formed should remain legible. If the markings have a suitable width, it is found that they remain also legible through a thin matt nickel layer deposited on the mould as an anti-corrosion layer. This is important because the moulds are generally stored with such a protective layer and because identification should be possible after the process. This means that the marking of the mould must be legibile after deposition of the protective layer.

The marking with which a mould is provided can be made on a mould which is a positive of the master and in a mould which is a negative of the master.

A reflection coating provided on the information-carrier side carrying the information structure may enhance the legibility of the markings. Generally, the marking is situated on the information-carrier side carrying the information structure and only on the opposite side in special cases.

In a further embodiment of the invention the marking is formed as a recess having a depth between 0.1 μm and 3 μm, preferably 1 μm.

Most commercially available optically readable disc-shaped information carriers have information structures of a depth smaller than 1 μm. This is for example so for Compact Discs. Suitably, the markings of the moulds for the production of such disc-shaped information carriers have a depth 0.1 μm and 3 μm. It is found to be particularly advantageous if the markings have a depth of approximately 1 μm. In that case the markings will not disturb the transfer-moulding process but may still be read satisfactorily.

In a further embodiment of the invention the recess is formed by means of a laser. Since a laser is already used in the production process of the master, it is advantageous to use this laser also for forming the markings both in the master as well as the moulds. However, alternatively the markings may be formed, for example, electrochemically, or mechanically by indentation or by a machining operation.

In a further embodiment of the invention, for forming the recess in a nickel mould provided with a protective lacquer coating, the laser beam is focussed to a depth directly underneath the protective lacquer coating and its wavelength is selected such that the energy of the laser light is mainly absorbed by the nickel.

The moulds thus derived from the master, including the stamper, are generally made of nickel. These nickel moulds are often provided with a protective lacquer coating in order to protect the moulds against damage, soiling or oxidization during storage. It is desirable that after application of the protectve lacquer coating the moulds be provided with markings in the form of recesses in producing the recesses the laser beam is focussed to a depth directly underneath the protective lacquer coating. Moreover, if the wavelength of the beam is selected such that the energy of the laser light is mainly absorbed by the nickel, this enables a recess to be formed in the nickel without the superimposed protective lacquer coating being damaged. The protective lacquer coating then remains intact and completely covers the nickel mould. This is particularly advantageous as the evaporated nickel need not be exhausted when the recesses are thus made because the nickel material whose phase has been converted by means of the laser cannot escape but can only spread underneath the transparent lacquer coating and may slightly diffuse into this coating, which is not a problem because the transparent lacquer coating is removed before the mould is used. Moreover, the recess need not be formed under clean-room conditions because as a result of the imperforate protective lacquer coating no extraneous particles can reach the nickel mould. In this way the markings can be formed economically, because neither exhaustion nor clean-room conditions are required, which always demand a substantial expenditure.

An embodiment of the invention will now be described in more detail, by way of example, with reference to the accompanying drawing.

FIG. 1 by way of example shows an optically readable disc-shaped information carrier in the form of a Compact Disc 1 to an enlarged scale. In principle, such a Compact Disc comprises a polycarbonate disc of which one side carries an information structure 4. This information structure is provided with a reflection layer not shown, which in its turn is covered with a protective lacquer in a manner, not shown but well known in the art. The Figure shows the Compact Disc 1 from the reading side. This is the side of the polycarbonate disc which is situated opposite the side carrying the information. From this side the information structure is read through the polycarbonate disc. In its center the disc-shaped information carrier has a center hole 3. The area in which the information structure 4 is situated is annular and is concentric with the center hole 3, extending substantially up to the outer circumference of the information carrier. Towards the centre the information structure extends up to substantially one third of the total radius of the information carrier, so that an annular information-free area 7 is left between the center hole 3 and the inner radius of the information structure 6. This area 7, which is generally also provided with a reflective coating, often carries the catalogue number 8, which allows the programme represented by the information structure of the information carrier to be identified. This marking 8 is already formed in the master in the manner described earlier and is preserved throughout the replication steps of the moulds, including those yielding the disc-shaped information carrier. In particular, if at least at the location of the markings 8 the area 7 is also provided with a reflective coating, the markings 8 are sufficiently large to be identified with the naked eye.

In a method in accordance with the invention both the master and at least one of the subsequent moulds are provided with an aspect of identification markings. In the present embodiment, in a manner not shown but well known in the art, a first mould is derived from a master, a second mould is derived from the first mould, and a third mould is derived from the second mould. The third mould is then used as the stamper. In accordance with the inventive method both the master and the three moulds derived in the subsequent replication process can each be identified by means of markings formed on them. The markings are made in the moulds in a manner as described in the foregoing, i.e. in the information-free area 7. In FIG. 1 four markings 9, 10, 11 and 12 are shown. In the present embodiment the marking 9 is the marking indicating the number of the master, which is "M4" in the present case. The marking 10 indicates the number, in the present case "A2", of the first mould, derived from the master. From this mould a second mould is derived, which is designated "B3" is marking 11 in the present case. A third mould, here designated "C2" is marking 12, is derived from this second mould and is used as a stamper. The markings provided on the moulds are copied during every subsequent replication step including the production of the disc-shaped information carrier and are situated in the information-free area 7 of the information carrier. The markings 9 to 12 should also be of such a size that they can be detected with the naked eye. The markings preferably have a depth substantially corresponding to that of the information structure. The readability of the markings is very satisfactory if at least that portion of the information-free area 7 in which they are situated is also provided with the reflection coating. Thus, the markings 9 to 12 also enable the master and all the moulds derived in a subsequent replication process and used for the production of the information carrier to be identified subsequently. If the information carrier exhibits a flaw which may be attributed to a defect of the master or a subsequent mould, this can be verified. If a defective mould or a defective master has been identified, all further discs manufactured by means of said master or mould can also be identified subsequently.

Figure 2:
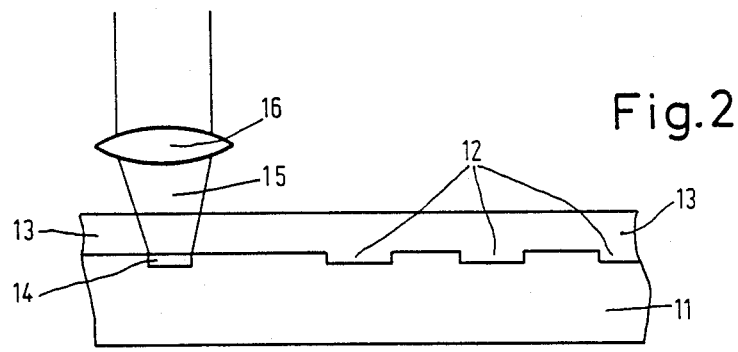
FIG. 2 is a sectional view of part of a nickel mold provided with a protective lacquer coating and being provided with a marking according to the invention.

FIG. 2 is a sectional view of a part of a nickel mould 11 provided with a protective coating 13. A portion of the part of the nickel mould 11 shown in FIG. 2 carries an information structure. This information structure comprises separate recesses 12. In the remaining area adjacent the area carrying the information structure the surface of the nickel mould is smooth. This area and the information-carrying area are provided with the protective coating 13.

In accordance with the invention the nickel mould 11 is provided with a marking 14 through the protective coating. The marking 14 is situated in the otherwise information-free area. The marking is formed in a way which is shown only schematically in FIG. 2 by means of a laser beam 15, which is focussed on an area of the nickel mould 11 slightly underneath the protective coating 13 by an optical system 16. In this way the recess 14 is formed by modifying the phase of the nickel material. By an appropriate choice of the wavelength of the laser light this light is mainly absorbed by the nickel material and to a smaller extent by the material of the protective lacquer. As a result of this, the protective-lacquer coating 13 remains intact above the recess 14 thus formed. A major advantage of this is that the evaporated nickel material cannot diffuse to the exterior but remains underneath the protective coating 13 and may partly diffuse into this coating. Since in this way no nickel material can reach the exterior no exhaustion is needed. Similarly, it is not necessary to work under clean-room conditions because the protective coating 14 remains imperforate and no extraneous particles can reach the surface of the nickel mould 11.

The nickel mould shown in FIG. 2 which in addition to the information structure is now also provided with a marking allowing subsequent identification of the mould, may be used directly as a stamper or via several replication steps further moulds can be derived from it, of which one mould may be used as a stamper. In any case, an information carrier manufactured by means of such a mould employed as a stamper is provided with the marking 14 in addition to the information structure 12. Such a marking may then for example take the form of the markings 9 to 12, in the same way as the disc-shaped information carrier 1 shown in FIG. 1.

Depending on whether the mould provided with the marking is a positive or a negative of the master, the marking ultimately formed on the disc-shaped information carrier takes the form of a recess or a projection. However, this is not relevant either from an optical point of view or in the production process, because the optical properties allowing the marking to be identified by refraction of light do not change and, moreover, the transfer-moulding process of the liquid polycarbonate during production is not disturbed because in any case the recess or projection has a depth or height not exceeding a few $\mu$m.

What is claimed is:

1. A method of marking an optically readable disc-shaped information carrier manufactured by molding by means of a stamper, of a multiplicity of stampers derived from a single master, by at least one electroforming replication step so as to identify said stamper, comprising providing each of said stampers with the negative of a marking unique to said stamper and positioned so as to provide each information carrier molded from each stamper a marking, unique to each stamper, positioned on an information free area of each information carrier.

2. The method of claim 1 wherein a multiplicity of electroforming replication steps are employed thereby producing in addition to the stampers, at least one mold from which said stampers are derived, comprising providing, in addition to said stampers, at least one of said molds with a marking unique to said mold and positioned so as to provide each information carrier molded from each stamper derived from said mold with a marking, unique to each stamper and to said mold, positioned on an information free area of each information carrier.

3. A method as claimed in claim 2, characterized in that the master and every mould, including the stamper, produced in the replication process between master and stamper is provided with an individual marking.

4. A method as claimed in claim 1, characterized in that the marking is formed as a recess having a depth which substantially corresponds to the depth of an information structure in the information carrier to be manufactured.

5. A method as claimed in claim 4, characterized in that the marking is formed as a recess having a depth between 0.1 $\mu$m and 3 $\mu$m.

6. A method of marking an optically readable disc-shaped information carrier manufactured by molding by means of a stamper, of a multiplicity of stampers derived from a single master, by at least one electroforming replication step so as to identify said stamper, comprising subjecting each of said stampers to the action of a laser in a manner so as to form a recess having a depth substantially corresponding to the depth of an information structure of each information carrier to be molded from each stamper and the negative configuration of a marking unique to said stamper thereby providing each of said stampers with the negative of a marking unique to said stamper and positioned so as to provide each information carrier molded from each stamper a marking unique to each stamper positioned on an information free area of each information carrier.

7. An optically readable disc-shaped information carrier manufactured by molding by means of a stamper of a multiplicity of stampers, derived from a single master by at least one electroforming replication step, said information carrier bearing a marking unique to said stamper, located on an information free area of said information carrier and forming part of its surface, said marking being formed by the molding of said information carrier by said stamper, each of said stampers being provided with the negative of a marking unique to each of said stampers and positioned so as to provide each information carrier molded from each stamper, a marking unique to each stamper positioned in an information free area of each information carrier.

* * * * *